(12) United States Patent
Harris et al.

(10) Patent No.: US 12,436,070 B2
(45) Date of Patent: Oct. 7, 2025

(54) MEMBRANE FILTER ASSEMBLY

(71) Applicant: INSIGHT ANALYTICAL SOLUTIONS INC, Calgary (CA)

(72) Inventors: Kevin Harris, Calgary (CA); Philip C. Harris, Calgary (CA)

(73) Assignee: INSIGHT ANALYTICAL SOLUTIONS INC, Calgary (CA)

( * ) Notice: Subject to any disclaimer, the term of this patent is extended or adjusted under 35 U.S.C. 154(b) by 0 days.

(21) Appl. No.: 19/118,504

(22) PCT Filed: Apr. 16, 2024

(86) PCT No.: PCT/CA2024/050489
§ 371 (c)(1),
(2) Date: Apr. 4, 2025

(87) PCT Pub. No.: WO2024/216375
PCT Pub. Date: Oct. 24, 2024

(65) Prior Publication Data
US 2025/0258069 A1    Aug. 14, 2025

Related U.S. Application Data

(60) Provisional application No. 63/459,806, filed on Apr. 17, 2023.

(51) Int. Cl.
*G01N 1/34* (2006.01)
*B01D 46/00* (2022.01)
*B01D 46/54* (2006.01)

(52) U.S. Cl.
CPC ........... *G01N 1/34* (2013.01); *B01D 46/0004* (2013.01); *B01D 46/0005* (2013.01); *B01D 46/543* (2013.01); *B01D 2265/029* (2013.01); *B01D 2265/06* (2013.01); *B01D 2273/10* (2013.01)

(58) Field of Classification Search
None
See application file for complete search history.

(56) References Cited

U.S. PATENT DOCUMENTS

| | | | |
|---|---|---|---|
| 5,360,545 A | * | 11/1994 | Pall ...................... A61M 1/0227 210/508 |
| 5,454,951 A | * | 10/1995 | Hoopman .............. B01D 29/05 210/456 |
| 5,800,597 A | | 9/1998 | Perrotta et al. |
| 6,357,304 B1 | | 3/2002 | Mayeaux |
| 7,004,041 B2 | | 2/2006 | Mayeaux |

(Continued)

OTHER PUBLICATIONS

International Search Report issued in International Application No. PCT/CA2024/050489 on Jul. 26, 2024, 2 pages.

(Continued)

*Primary Examiner* — Brit E. Anbacht
(74) *Attorney, Agent, or Firm* — ArentFox Schiff LLP; Joseph M. Maraia; Marlo Schepper Grolnic

(57) ABSTRACT

The invention provides a membrane filter assembly for analytical sample systems, and a sample system block assembly having a built-in membrane filter assembly. The filter assembly has a housing having recessed inner face having non-uniform depth, and a cover member having a plurality of concentric grooves and a radially oriented shallow groove crossing the concentric grooves, wherein the grooves each have wider top than the bottom.

21 Claims, 2 Drawing Sheets

(56) References Cited

U.S. PATENT DOCUMENTS 7,472,615 B2 1/2009 Mayeaux
7,555,964 B2 7/2009 Mayeaux

OTHER PUBLICATIONS

Written Opinion of the International Searching Authority issued in International Application No. PCT/CA2024/050489 on Jul. 26, 2024, 3 pages.
"Classic Filters," Mar. 13, 2017, pp. 1-148 [online] [retrieved on Jul. 1, 2024]. Retrieved from the Internet: <https://web.archive.org/web/20170313105243/http://shavongroup.com/wp-content/uploads/2012/09/Classic_Filters_Complete_Literature.pdf>.
Genie133 Supreme Membrane Separator, SC-133-VA_011520, <https://geniefilters.com/wp-content/uploads/SCC-133-VA.pdf>, 2023, 2 pages.
Genie Membrane Separator Model 101, SCC-101-PS_090821, <https://geniefilters.com/wp-content/uploads/SCC-101-PS.pdf>, 2023, 2 pages.
United Filtration Systems, GMS204-1/4", <https://unitedfiltration.com/wp-content/uploads/GMS205-0.25.pdf>, 2023, 2 pages.
"Modular Plat form Components (MPC) Surface-Mount Components, Substrates, Manifolds, Mounting Components, and Assembly Hardware," Swagelok, <https://www.swagelok.com/downloads/webcatalogs/en/ms-02-185.pdf>, 2023, 31 pages.
Parker IntraFlow™, "Compliant Modular Systems, ISA/ANSI SP76.00.02," Catalog 4520, <https://www.parker.com/content/dam/Parker-com/Literature/Instrumentation-Products-Division/INTRAFLOW_CAT_4250.pdf>, 2003, 12 pages.
"ACES—Analytically Correct Engineered Sample Systems," A+ Corporation, <https://geniefilters.com/product/aces-sample-systems/>, 2023, 4 pages.
"GR—Genie Regulator," A+ Corporation, <https://geniefilters.com/product/gr-single-stage-pressure-regulator/>, 2023, 4 pages.
"Genie Regulator Accessory Manifold: A low volume manifold designed specifically for gas sampling," A+ Corporation, <https://geniefilters.com/wp-content/uploads/SCC-GPR-ACC-PS.pdf>, 2023, 2 pages.
Mustang® Sample Conditioning System, "Gas Analysis Worksheet," <https://mustangsampling.com/system/mustang-sample-conditioning-system/>, 2023, 2 pages.
"DaVinci Analyzer Distribution Panel," A+ Corporation, <https://geniefilters.com/product/davinci-adp/>, 2023, 4 pages.

* cited by examiner

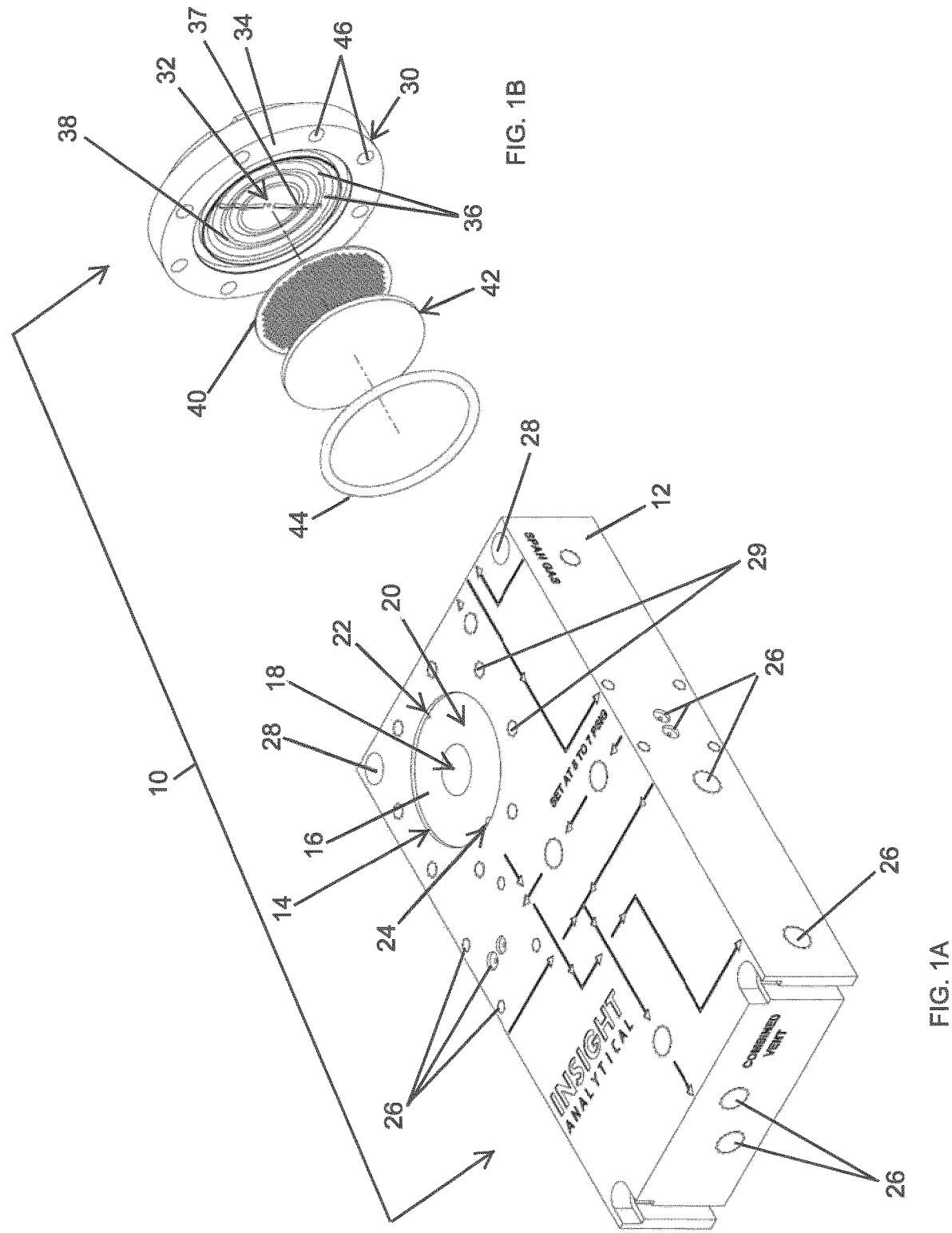

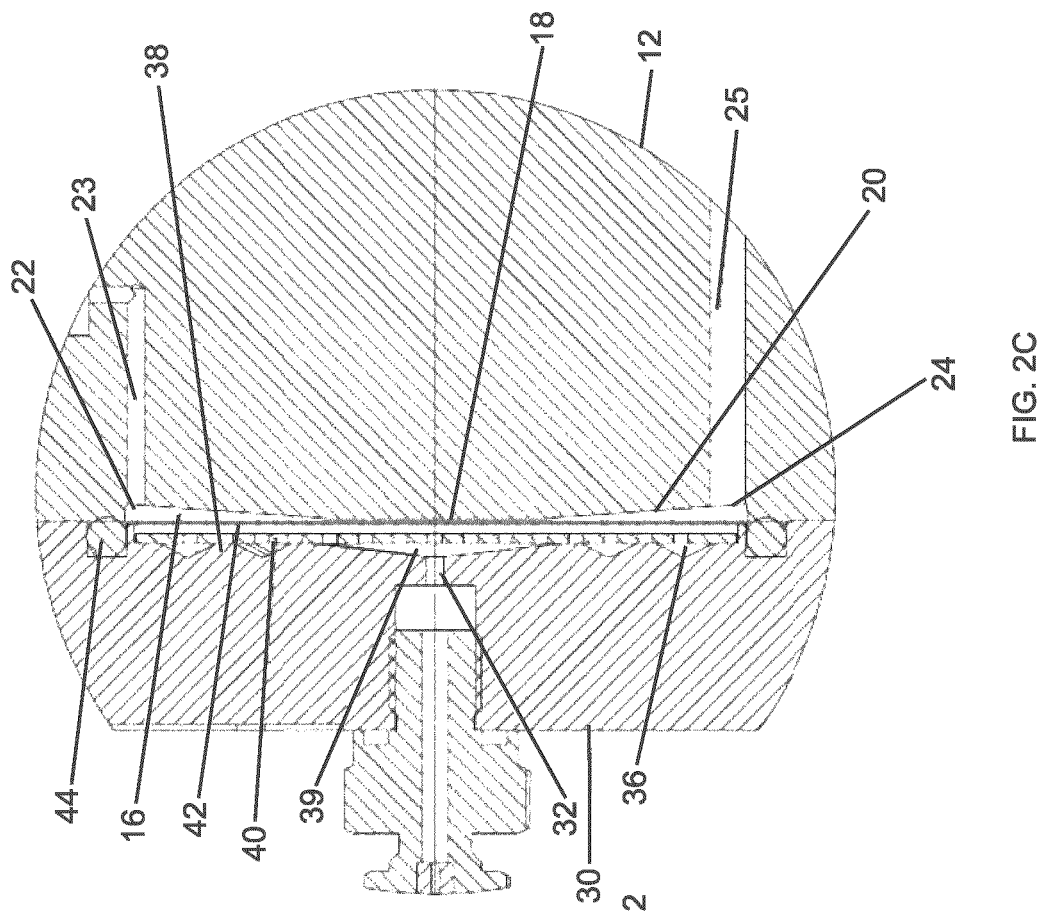
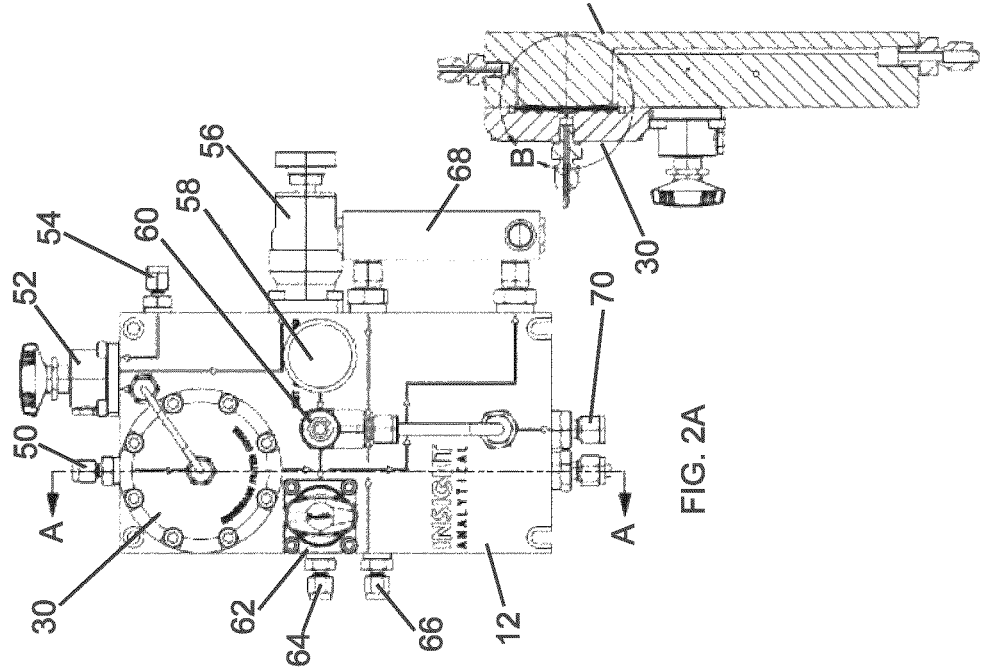

MEMBRANE FILTER ASSEMBLY

CROSS-REFERENCE TO RELATED APPLICATIONS

This application is the U.S. National Phase entry under 35 U.S.C. § 371 of International Application No. PCT/CA2024/050489, filed Apr. 16, 2024, entitled MEMBRANE FILTER ASSEMBLY, which in turn claims priority to and benefit of U.S. Provisional Application No. 63/459,806, filed Apr. 17, 2023, the contents of which are incorporated herein by reference in their entirety for all purposes.

FIELD OF THE INVENTION

The present invention relates to apparatus and systems for the physical separation of components from a multi-phase fluid stream into its component phases. More particularly, the invention relates to a membrane filter assembly for analytical sample systems, and a sample system block assembly having a built-in membrane filter assembly.

BACKGROUND OF THE INVENTION

The analyzers making measurements of chemical composition or physical properties of fluid samples extracted from processes require some form of sample system. The functions of these sample systems typically include: obtaining a representative sample of the process stream at the sample point, transporting the sample from the sample point to the analyzer while maintaining the integrity of the sample, conditioning the sample (if required) to be compatible with the requirements of the analyzer, switching streams, if required or to provide a method of introducing calibration standards, transporting the sample after analysis from the analyzer outlet to a disposal location without adversely affecting the analyzer operation, and maintaining the safety of the system.

A well designed sample system is required to accomplish these functions while meeting the requirements for timeliness (required speed of response time), accuracy and other requirements of the analysis system and optimizing the balance between meeting the performance factors with the cost of the equipment, installation, operation and maintenance which are inherent in any mechanical system.

Most of the commercially available fluid analyzer sample systems compromise between cost, accuracy, maintenance requirements, and application performance, because the commercially available sample system/conditioning components such as filters and pressure regulators are designed to work in the widest variety of applications possible with their design being a compromise between cost, chemical compatibility, pressure handling, response time, flow capacity etc. The majority of these components are designed to be used in conventional sample systems where discrete components are connected with tubing/piping and compression/threaded fittings, with the instrument tubing/compression fittings combination being the most prevalent method of connection.

These conventional sample system/conditioning components are typically mounted on a panel with the components spaced out sufficiently to allow for tubing to be run between them and connections made with compression fittings. This sort of layout results in systems which take up a lot of space and require significant labor to assemble and leak test. Most components have tapered NPT type pipe threads for inlet and outlet connections which results in many possible leakage points and large internal volumes, which results in long response times for a given sample flow rate.

Modular and compact sample systems under SP76/NeSSI system standard have been designed to mitigate some of the problems with the conventional sample systems. The modular systems have allowed for companies to develop interchangeable components along with modular substrates to mount them on, with component interconnection incorporated into the substrate instead of relying on external tubing and fittings.

While a significant number of these SP76 based sample systems have been built and installed in the process instrumentation industry their rate of adoption has been less than expected, most likely due to difficulty in understanding sample flow path, limited material choices, and very high component and substrate cost.

The SP76 systems are very compact with no space between the components for markings and often have several rows of components clustered together. This arrangement can make it difficult to understand the sample flow path between components which is needed for adjustments to be made to settings during normal operation and to troubleshoot issues that may eventually occur. While SP76 compliant versions of many different commonly used sample system/conditioning components such as pressure regulators, back pressure regulators, manual ball valves, metering valves, and check valves are relatively readily available, there is limited choice in compatible versions of other components such as pressure relief valves, filters, rotameters and pneumatic valves and these types of components often have very limited pressure ratings or flow capacities because their sizing must fit within the standard substrate footprint.

The limited selection of SP76 compatible components is especially limited for filters where the only choices are between a few small particulate, coalescing or membrane filters. For the coalescing and membrane filters that typically incorporate fast loop/drain/bypass flow to allow any separated liquids to drain, the available filters do not have these drain ports integrated into the substrate, and therefore external connections must be made which can make them cumbersome to work on when the filter elements need changing.

One of the characteristics common to both conventional and SP76 based filters is poor response time, as current designs of membrane filters have internal geometries that tend to result in significant internal volume and poor mixing, which results in relatively slow response time for a given flow rate.

Therefore there is a need for a membrane filter assembly which can achieve effective filtration with faster response time.

There is also a need for a compact, cost-effective sample conditioning system that includes filtration, pressure regulation, pressure measurement, over-pressure protection, and flow control, which is easy to understand, operate and maintain, minimize chance of leaking, and have fast response time.

SUMMARY OF THE INVENTION

An object of the present invention is to provide a membrane filter assembly, and a sample system block assembly having the built-in membrane filter assembly.

In accordance with an aspect of the present invention, there is provided a filter assembly for use with a membrane filter for separating liquids and particulates from a gas stream, the filter assembly comprising: a) a filter housing having a first face having: a recess having a non-uniform depth, the recess having a central portion and a peripheral portion, wherein the depth of the central portion is less than the depth of the peripheral portion, a fluid inlet port and fluid bypass port, each in fluidic communication with the peripheral portion of the recess and located at opposing edges of the recess; and b) a cover member configured to sealingly engage the first face of the filter housing, the cover member having a gas outlet port positioned at or near the center of the cover member, the cover member having: an inner face configured to support the membrane filter, the inner face having a plurality of concentric grooves and a radially oriented shallow groove crossing the plurality of concentric grooves and configured to allow the gas to flow toward the gas outlet port, wherein each of the plurality of concentric grooves has a top wider than a bottom.

In accordance with another embodiment of the invention, there is provided a sample system block assembly for use in a sample conditioning system and with a membrane filter for removing liquids and particulates from a gas stream, the sample system block assembly comprising: a sample system block comprising one or more sample passages configured for connection with one or more sample conditioning components via respective connection ports; and a filter assembly comprising: a) a filter housing machined into the sample system block, the housing having a first face having: a recess having a non-uniform depth, the recess having a central portion and a peripheral portion, wherein the depth of the central portion is less than the depth of the peripheral portion, a fluid inlet port and fluid bypass port, each in fluidic communication with the peripheral portion of the recess and located at opposing edges of the recess; and b) a cover member configured to sealingly engage the first face of the filter housing, the cover member having a gas outlet port positioned at or near the center of the cover member, the cover member having: an inner face configured to support the membrane filter, the inner face having a plurality of concentric grooves and a radially oriented shallow groove crossing the plurality of concentric grooves and configured to allow the gas to flow toward the gas outlet port, wherein each of the plurality of concentric grooves has a top wider than a bottom.

BRIEF DESCRIPTION OF THE FIGURES

The invention will now be described by way of an exemplary embodiment with reference to the accompanying simplified, diagrammatic, not-to-scale drawings. In the drawings:

FIG. 1A depicts a simplified view of a sample system block of a sample system block assembly, in accordance with an embodiment of the present invention.

FIG. 1B depicts an exploded view of a cover member of the sample system block assembly, in accordance with an embodiment of the present invention.

FIG. 2A depicts a simplified view of a sample system block assembly, in accordance with an embodiment of the present invention.

FIG. 2B depicts a cross sectional view FIG. 2A.

FIG. 2C depicts an enlarged fragmentary view of FIG. 2B.

DETAILED DESCRIPTION OF THE INVENTION

Unless defined otherwise, all technical and scientific terms used herein have the same meaning as commonly understood by one of ordinary skill in the art to which this invention belongs.

Unless the context requires otherwise, throughout this specification and claims, the words "comprise", "comprising" and the like are to be construed in an open, inclusive sense.

The articles "a" and "an" are used herein to refer to one or to more than one (i.e., to at least one) of the grammatical object of the article. By way of example, "an element" means one element or more than one element.

As used herein, the term "about" refers to approximately a +/−10% variation from a given value. It is to be understood that such a variation is always included in any given value provided herein, whether or not it is specifically referred to.

The present invention provides a membrane filter assembly for use with a membrane filter for separating/removing liquids and particulates from a gas within a gas stream, with improved mixing which can achieve effective filtration with faster response time. The filter assembly of the present invention can be used as a standalone membrane filter unit, or can be incorporated into a sample system block of a sample conditioning and analyzing system.

The membrane filter assembly of the present invention comprises a filter housing having a recessed inner face, and a cover member. The recess of the filter housing has a non-uniform depth, such that the depth of the central portion of the recess is less than the depth of the peripheral portion. The housing further includes a fluid inlet port and fluid bypass port, each in fluidic communication with the peripheral portion of the recess and located at a respective one of two opposing edges of the recess. The cover member is configured to sealingly engage the filter housing, and has a gas outlet port positioned at or near the center of the cover member and the cover member has an inner face configured to support the membrane filter. The inner face of the cover member is provided with a plurality of concentric grooves and a radially oriented shallow groove crossing the concentric grooves.

The concentric grooves each have a top wider than a bottom, for example a substantially v-shaped cross-section with sharp or rounded corners (substantially u-shaped) and with straight or curved walls.

The non-uniform depth in the recess could be achieved either by a constant or a non-constant taper from the central portion to the peripheral portion. The non-constant taper can be achieved by increasing the depth proportionally with the square root of the diameter. There can also be a section in the center with a constant shallow depth which increases towards the peripheral region. In some embodiments, the peripheral region is about 1.5 to about 15 times deeper at than the central region.

In some embodiments, the filter assembly further comprises a porous and/or perforated membrane support plate located between the membrane filter and the inner face of the cover member. In some embodiments, the membrane support plate is supported by the multiple ridges formed by the plurality of concentric grooves. The membrane support plate can prevent the membrane from deforming from the pressure differential across it created by the membrane flow resistance. The membrane support plate can be made of any suitable material, such as metal(s), polymer(s), ceramic, etc.

In some embodiments, the cover member sealingly engages the housing via an O-ring located in the outermost groove of the plurality of concentric grooves, wherein the O-ring is configured to be in contact with the outer edge of the membrane filter.

In some embodiments, the cover member is attached to the filter housing by one or more attachment members, such as screws, bolts etc.

In some embodiments, the cover member is configured to threadingly engage the filter housing. For example the cover member can be provided with a threaded portion configured to be threaded inside the filter housing.

In some embodiments, the filter housing comprises a fluid inlet passage and a fluid bypass passage, the fluid inlet passage is in fluidic communication with the recess via the fluid inlet port, and the fluid bypass passage is in fluidic communication with the recess via the fluid bypass port. In some embodiments, the fluid inlet passage has a diameter smaller than a diameter of the fluid bypass passage. In some embodiments, the fluid intlet port and/or the fluid intlet passage has a diameter about 1 to about 2.5 mm.

In some embodiments, the filter assembly of the present invention is part of a sample conditioning system, wherein the filter housing is machined into a sample system block.

The filter housing and/or the cover member can be made of any suitable material, such as metals, alloys, plastic, etc. In some embodiments, the filter housing and/or the cover member is made of aluminum alloy, which is either anodized or electroless nickel plated or electroless cobalt plated.

In another aspect, the present invention provides a sample system block assembly for use in a sample conditioning and analyzing system, along with a membrane filter for separating/removing liquids and particulates from a gas in a gas stream.

The sample system block assembly of the present invention comprises a sample system block comprising one or more sample passages configured for connection with one or more sample conditioning components via respective connection ports, and a filter assembly, wherein the filter housing is machined into the sample system block.

In some embodiments, the sample system block has an upper end portion and a lower end portion, wherein the recessed housing is defined at the upper end portion of the sample system block. The recessed housing is provided with an inlet port towards (at or near) the upper end portion of the recess, and the outlet port towards (at or near) the lower end portion of the recess.

In some embodiments of the sample system block assembly further comprises one or more connection members (such as tubing/piping, compression/threaded fittings, etc.) configured to connect the one or more sample passages with the sample system conditioning components (such as filters and pressure regulators, valves, etc.). In some embodiments, the one or more connection members can be selected from a straight threaded fitting, an o-ring seal compression fitting, a fitting with NPT threads, or a combination thereof.

In some embodiments of the sample system block assembly further comprises the one or more sample system/conditioning components connected to the one or more connection ports via the one or more connection members.

In some embodiments of the sample system block assembly further comprises one or more mounting members for mounting the sample system block to a wall or mounting strut with no additional panel required, which reduces cost and required space. Non-limiting example of mounting members include one or more mounting openings/holes machined into the system block.

The sample system block of the present invention can be made of any suitable material, such as metals, alloys, plastic, etc. In some embodiments, the sample system block is made of aluminum alloy, which is one of anodized or electroless nickel plated, or electroless cobalt plated.

In some embodiments, the sample system block can have lines and/or arrows machined/engraved on the outside surface of the block to show the flowpath, along with inlet and outlet connections labelled, and setpoint values such as flows or pressures included on the block, which makes it much easier for an operator to understand the sample system, so therefore easier to maintain and work on.

The presence of a recess having non-uniform depth in the filter assembly of the present invention assists in mitigating issues relating to slow response time in the upstream of membrane filter chamber, as for a given maximum depth the volume can be reduced by about one third and the mixing is dramatically improved because the gas flow between inlet and bypass/drain port is more evenly spread out over the whole width of the recessed face since the path with the lowest pressure drop follows the outside diameter of the recessed face which is also where the majority of the volume is located.

The filter assembly of the present invention also mitigates the problem associated with significant internal volume and poor mixing on the downstream side of the filter members, as grooves with the wider tops increase mixing by increasing flow velocity and removing "corners" in the flow path. For example, in comparison to the square/rectangular (parallelogram) shaped grooves of the known membrane filters, the substantially "V" or "U" shaped concentric grooves having wider top facing the back of the porous/perforated membrane support plate allows gas to be flow through the support plate unhindered but reduces the volume of the grooves by about ⅓ compared to parallelogram grooves of equal depth, which for a given gas flow rate, increases the gas velocity and also turbulence and mixing. The net result of this better mixing and lower groove volume is faster response time compared to existing designs.

The presence of the narrow slot cutting across the plurality of concentric grooves also allows gas to flow to the center where the outlet port is located. The multiple ridges (formed by the concentric grooves) provide better support for the membrane support plate as compared to the single recess design where the plate is only supported around the outer edge. This extra support allows the plate to be thinner and therefore have less internal volume. The concentric grooves force gas flow to move along relatively narrow channels before gathering at the center to flow through the outlet port and this can result in more efficient mixing/volume change out and therefore faster response time.

The reduced volume and better mixing makes it possible to use larger diameter membrane filters while still maintaining very fast response time. A larger diameter membrane tends to be more effective at rejecting liquids than smaller diameter versions for a given sample flow rate because the increased membrane surface area lowers the pressure differential across the membrane and the velocity of the gas passing through the membrane. High pressure differentials and velocities across filter membranes are undesirable because liquids can be forced through the pores in the membrane. For a given flow rate a large diameter membrane also takes longer to be plugged by particulates, and therefore does not need to be replaced as often. Larger diameter membranes also have larger flow capacities so high flow rates can be used if required to further reduce response times or to feed multiple analyzers.

The sample system block assembly of the present invention, wherein a filter housing is machined into the sample system block reduces the number of external connections/tubing/fitting/leak points, and allows for a compact size. This allows a larger diameter membrane filter to be used than a SP76 substrate system can accommodate which provides more reliable filtration of liquids, reduced tendency to get plugged by particulates, and longer service life.

Use of a combination of compression fittings with NPT threads, and straight threaded fittings with o-ring seals to mount sample system/conditioning components such as pressure gauges, over-pressure relief valves, and flow meters instead of SP76/NeSSI hardware can greatly reduce cost.

The machined sample system block can be custom machined for an application with reduced internal passage size 2 mm in diameter which offers improved response time than either conventional sample systems or SP76 based systems.

The use of straight threaded o-ring seal compression fittings for external connections reduces assembly costs, the likelihood of leaks, and eliminates issues with galling or the need for Teflon tape or liquid thread sealant. Eliminating Teflon tape and thread sealant makes assembly and maintenance faster and easier.

Using straight threaded o-ring seal compression fittings lowers the internal volume, which improves the response time, because the holes only need to be very slightly deeper than the fittings that they contain—this is because the installation depth of these types of fittings is repeatable which is not the case for NPT style fittings where the installation depth depends on tolerances on both the fitting and threaded hole, the installation torque for the fitting, and the number of times the fitting has been removed and reinstalled.

The machined sample system block can be laid out so that external connections (inlet, outlet, vent, calibration gas, etc.) are in the optimal locations relative to the analyzer.

The machined sample system block is compatible with rotameters of different scale length which makes it more flexible and allows for the use of armoured rotameters (sometimes required for safety reasons) when they are required.

In the case of contamination or other problems somewhere in the sample system, the problematic sample system block can quickly be replaced with a spare and the block needing maintenance can be repaired in a shop instead of in the field.

To gain a better understanding of the invention described herein, the following examples are set forth with reference to the accompanying drawings, which are not drawn to scale, and the illustrated components are not necessarily drawn proportionately to one another. It will be understood that these examples are intended to describe illustrative embodiments of the invention and are not intended to limit the scope of the invention in any way.

EXAMPLES

FIG. 1A is a simplified diagram of a sample system block of an exemplary sample system block assembly, and FIG. 1B is an exploded view of the cover member thereof.

Referring to FIGS. 1A, the sample system block 12 of this example has a filter housing 14 machined into the block. The housing has an inner face having a recess 16 having a central portion 18 and a peripheral portion 20, wherein the depth of the central portion is less than the peripheral portion. The depth of the recess is deepest at the peripheral region and shallowest at the center, which reduces internal volume and improves mixing, which in turn improve response time.

A fluid inlet port 22, in fluid communication with an inlet passage (not shown), is located at a top edge of the recess 16 to receive a fluid stream, and a bypass port 24, in fluidic communication with an outlet passage (not shown), is located at the opposing edge of the recess, to allow a bypass/drain flow to exit the filter housing along with any separated liquids/particulates. The sample system block also has multiple connection ports 26 for sample conditioning components, and one or more mounting openings 28.

Referring to FIG. 1B, the cover member 30 has a gas outlet port 32 positioned at or near the center of the cover member. The cover member has an inner face 34 having a plurality of concentric gas collection grooves 36, and a radially oriented shallow groove 37 crossing the concentric grooves to allow the gas to flow toward the outlet port 32. A membrane support plate 40 is provided and supported by the ridges 38 formed by the concentric grooves 36. An o-ring 44 seals around a membrane filter 42, which is configured to be held in place in the outermost groove on the inner face of the cover member. The cover is secured to the sample system block with screws via connection openings/holes 46 provided in the cover member and their corresponding openings/holes 29 in the block.

The concentric grooves allow the gas to flow through the membrane filter and support plate unhindered and then to flow to the central outlet port. The grooves are roughly triangular with a wide opening behind the membrane support plate to maximize gas flow through the plate.

FIG. 2A depicts another example of a sample system block assembly comprising a sample system block 12 having a filter housing machined into the block, and a filter cover member 30 (same as depicted in FIGS. 1A and 1B), wherein the filter cover member is sealingly engaged with the housing while holding a filter membrane and a membrane support plate, and wherein the sample system block is further equipped with connection members for sample system/conditioning components, and/or sample components. FIG. 2B depicts a cross sectional view of FIG. 2A, and FIG. 2C depicts an enlarged fragmentary view of FIG. 2B.

As shown in FIGS. 2C, the filter housing 14 is machined into the sample system block 12. The housing has an inner face having a recess 16 having a central portion 18 and a peripheral portion 20, wherein the depth of the central portion is less than the peripheral portion.

A fluid inlet port 22 is in fluid communication with an inlet passage 23 machined into the block and located at the upper end of the recess. A bypass port 24 is in fluidic communication with an outlet passage 25 machined into the block, and located at the lower end of the recess, to allow a bypass/drain flow to exit the filter housing along with any separated liquids/particulates.

The cover member 30 is provided with a gas outlet port 32 positioned at or near the center of the cover member. The cover member has an inner face having a plurality of concentric grooves 36, and a radially oriented shallow groove crossing the concentric grooves to allow the gas to flow toward the outlet port. The concentric grooves are substantially triangular in cross-section, thereby creating a central collection area 39 having a substantially triangular cross section to minimize volume.

A membrane support plate 40 is located between the inner face of the cover member and a membrane filer 42 and supported by the ridges 38 formed by the concentric grooves 36. An O-ring 44 seals around the membrane filter 42 and is held in place in the outermost groove on the inner face of the cover member.

Referring to FIG. 2A, the sample system block of this example is further provided with:
    a sample fluid inlet fitting 50, which in this case is a straight threaded type fitting with an o-ring seal;
    a SP76 type 3-way ball valve 52 that can be used to switch the analyzer gas supply between the sample gas from the membrane filter outlet and a calibration gas fitting;

a calibration gas connection fitting 54, which is an o-ring seal type fitting with straight threads to avoid the use of sealing tape or liquid sealant;

a SP76 type pressure regulator 56 to adjust the delivery pressure of the sample gas supplied to the inlet of the gas analyzer;

a conventional pressure gauge 58 for measuring the outlet pressure setting of the pressure regulator, which connects to the block using an o-ring seal type fitting (more economical than the SP76 type fitting), and this type of connection also allows the use of a smaller diameter hole (for example 1 mm) to achieve the pressure connection and this limits the influence of the dead volume inside of the fitting and gauge on the response time;

an over pressure relief valve 60 connected to the block using an o-ring seal type fitting which is more economical than an SP76 style;

a SP76 type 2-way ball valve 62 to shut off the sample gas supply to the analyzer during maintenance;

a fitting 64 for connecting the sample system block to the gas analyzer inlet which is in this case an o-seal type fitting for the reasons previously mentioned.

a fitting 66 for connecting the gas analyzer vent to the sample system block which is again an o-seal type fitting;

a rotameter flow meter 68 with inlet metering valve for measuring and controlling the amount of bypass/drain flow running through the membrane filter. The inlet and outlet of the rotameter are connected to the block using o-seal type fittings which can be located as required to accommodate different flow meter scale lengths; and a combined vent outlet fitting that provides a connection point for the combined vent flow from the gas analyzer vent, the membrane filter bypass flow and the outlet of the over pressure relief valve in the event where this valve opens due to the pressure being too high.

This combination of sample system design with the improved membrane filter assembly built into the machined block and mixing SP76 based sampling components, conventional sample system components and o-ring fittings offers the following advantages as a system:

More economical than either conventional sample systems or SP76 sample systems.

More compact than conventional sample systems.

Easier to understand and work on than SP76 sample systems.

Incorporates a larger diameter membrane filter than SP76 systems can accommodate.

Novel geometry inside of membrane filter results in very fast response time.

Low internal volume of passages in machined block and seamless connections between components results in faster response time than either conventional or SP76 based sample systems.

Area and mass of machined block increases heat transfer to SP76 type pressure regulators which helps to counter the cooling created by the Joule-Thomson cooling so keeps the pressure reduction closer to isothermal compared to conventional or SP76 based systems without actively heated pressure regulators.

Lower sample flow rates can be used for a given sample response time which results in lower fugitive/engineered emissions.

Modular nature of system facilitates practice of replacing entire system with spare and performing repair/maintenance in shop rather than in field, resulting in less downtime.

Reduced parts count compared to either conventional or SP76 based sample systems reduces inventory, improves delivery, and reduces supply chain issues.

Reduced assembly labor compared to both conventional and SP76 based sample systems.

Reduces the likelihood of gas leaks because of reduced connections and replacing NPT/Sealant type connections with O-ring seals.

Reduced issues with contamination from Teflon tape or liquid thread sealant.

Reduced issues with thread galling which is common with NPT threads and increase life for fittings, components and other connections because of the elimination of tapered pipe (NPT) threads.

While particular embodiments of the present invention have been illustrated and described, the scope of the claims should not be limited by the preferred embodiments set forth in the examples/drawings, but should be given the broadest interpretation consistent with the description as a whole.

We claim:

1. A filter assembly for use with a membrane filter for separating liquids and particulates from a gas stream, the filter assembly comprising:
   a) a filter housing having a first face having:
       a recess having a non-uniform depth, the recess having a central portion and a peripheral portion, wherein the depth of the central portion is less than the depth of the peripheral portion,
       a fluid inlet port and fluid bypass port, each in fluidic communication with the peripheral portion of the recess and located at a respective one of two opposing edges of the recess; and
   b) a cover member configured to sealingly engage the first face of the filter housing, the cover member having a gas outlet port positioned at or near the center of the cover member,
       the cover member having:
           an inner face configured to support the membrane filter,
           the inner face having a plurality of concentric grooves and a radially oriented shallow groove crossing the plurality of concentric grooves and configured to allow the gas to flow toward the gas outlet port, wherein each of the plurality of concentric grooves has a top wider than a bottom.

2. The filter assembly of claim 1, wherein the concentric grooves have substantially v-shaped cross-section and/or u-shaped cross-section with straight or curved walls.

3. The filter assembly of claim 1, further comprising a porous and/or perforated membrane support plate located between the membrane filter and the inner face of the cover member.

4. The filter assembly of claim 1, wherein the cover member sealingly engages the filter housing via an O-ring located in an outermost groove of the plurality of concentric grooves, wherein the O-ring is configured to be in contact with an outer edge of the membrane filter.

5. The filter assembly of claim 1, wherein the cover member is attached to the filter housing by one or more attachment members, or the cover member is configured to threadingly engage the filter housing.

6. The filter assembly of claim 1, wherein the filter housing comprises a fluid inlet passage in fluidic communication with the recess via the fluid inlet port, and the filter housing further comprises a fluid bypass passage in fluidic communication with the recess via the fluid bypass port.

7. The filter assembly of claim 6, wherein the fluid inlet passage has a diameter smaller than a diameter of the fluid bypass passage.

8. A sample system block assembly for use in a sample conditioning system and with a membrane filter for removing liquids and particulates from a gas stream, the sample system block assembly comprising:
 a sample system block comprising one or more sample passages configured for connection with one or more sample conditioning components via respective connection ports; and
 a filter assembly comprising:
 a) a filter housing machined into the sample system block, the filter housing having a first face having:
  a recess having a non-uniform depth, the recess having a central portion and a peripheral portion, wherein the depth of the central portion is less than the depth of the peripheral portion,
  a fluid inlet port and fluid bypass port, each in fluidic communication with the peripheral portion of the recess and located at a respective one of two opposing edges of the recess; and
 b) a cover member configured to sealingly engage the first face of the filter housing, the cover member having a gas outlet port positioned at or near the center of the cover member,
  the cover member having:
   an inner face configured to support the membrane filter,
   the inner face having a plurality of concentric grooves and a radially oriented shallow groove crossing the plurality of concentric grooves to allow the gas to flow toward the gas outlet port, wherein each of the plurality of concentric grooves has a top wider than a bottom.

9. The sample system block assembly of claim 8, wherein concentric grooves have a substantially v-shaped cross-section and/or u-shaped cross-section with straight or curved walls, and optionally comprising a porous/perforated membrane support plate located between the membrane filter and the inner face of the cover member.

10. The sample system block assembly of claim 8, wherein the cover member sealingly engages the filter housing via an O-ring located in the outermost groove of the plurality of concentric grooves, wherein the O-ring is configured to be in contact with an outer edge of the membrane filter.

11. The sample system block assembly of claim 8, wherein the cover member is attached to the filter housing by one or more attachment members, or the cover member is configured to threadingly engage the filter housing.

12. The sample system block assembly of claim 8, wherein the filter housing comprises a fluid inlet passage in fluidic communication with the recess via the fluid inlet port, and a fluid bypass passage in fluidic communication with the recess via the fluid bypass port.

13. The sample system block assembly of claim 12, wherein the fluid inlet passage has a diameter smaller than a diameter of the fluid bypass passage.

14. The sample system block assembly of claim 8, wherein the sample system block has a top end portion and a bottom end portion, and wherein the recessed housing is defined at the top end portion of the sample system block.

15. The sample system block assembly of claim 8, further comprising one or more connection members configured to connect the one or more connection ports with the sample conditioning components.

16. The sample system block assembly of claim 15, wherein the one or more connection members are selected from a straight threaded fitting, an O-ring seal compression fitting, a fitting with NPT threads, and a combination thereof.

17. The sample system block assembly of claim 15, further comprising the one or more sample conditioning components, the one or more sample conditioning components connected to the one or more connection ports via the one or more connection members.

18. The sample system block assembly of claim 8, further comprising one or more mounting members configured to mount the sample system block to a wall or mounting strut.

19. The sample system block assembly of claim 18, wherein the one or more mounting members are one or more mounting openings machined into the sample system block.

20. The sample system block assembly of claim 8, wherein the one or more sample passages are machined into the sample system block, and optionally a sample flow schematic is engraved on an outside surface of the sample system block.

21. The sample system block of claim 8, wherein the sample system block is made of aluminum alloy, which is either anodized, or electroless nickel or cobalt plated.

* * * * *